United States Patent [19]
Soltwedel

[11] Patent Number: 6,008,462
[45] Date of Patent: Dec. 28, 1999

[54] MAR RESISTANT, CORROSION INHIBITING, WELDABLE COATING CONTAINING IRON POWDER FOR METAL SUBSTRATES

[75] Inventor: Jeffrey N. Soltwedel, Dublin, Ohio

[73] Assignee: Morton International, Inc., Chicago, Ill.

[21] Appl. No.: 08/942,220

[22] Filed: Oct. 1, 1997

[51] Int. Cl.$^6$ ..................................................... B23K 11/10
[52] U.S. Cl. .................. 219/91.2; 219/91.21; 219/117.1; 219/118; 427/386; 427/388.2; 427/388.4; 523/402; 523/406; 523/442; 523/512
[58] Field of Search .................................. 427/386, 388.2, 427/388.4; 219/91.2, 91.21, 117.1, 118; 523/402, 406, 442, 512

[56] References Cited

U.S. PATENT DOCUMENTS

| | | | |
|---|---|---|---|
| 2,666,835 | 1/1954 | Elleman | 219/10 |
| 2,758,983 | 8/1956 | Toulmin, Jr. | 260/40 |
| 3,112,283 | 11/1963 | Hansen et al. | 260/17.4 |
| 3,406,105 | 10/1968 | Letendre | 204/16 |
| 3,503,882 | 3/1970 | Fitch | 252/62.54 |
| 3,867,299 | 2/1975 | Rohatgi | 252/62.54 |
| 4,081,423 | 3/1978 | Hardenfelt | 260/40 R |
| 4,115,338 | 9/1978 | Kobayahsi et al. | 260/29.4 UA |
| 4,152,368 | 5/1979 | Dorfman et al. | 260/862 |
| 4,195,014 | 3/1980 | Dorfman et al. | 260/45.75 R |
| 4,320,048 | 3/1982 | Harmuth | 523/333 |
| 4,469,714 | 9/1984 | Wada et al. | 427/54.1 |
| 4,559,373 | 12/1985 | Guthrie et al. | 524/440 X |
| 4,661,675 | 4/1987 | Guthrie et al. | 219/91.21 |
| 5,001,173 | 3/1991 | Anderson et al. | 523/406 |
| 5,030,816 | 7/1991 | Strecker | 219/91.2 |
| 5,047,451 | 9/1991 | Barrett et al. | 523/442 |
| 5,082,698 | 1/1992 | Anderson et al. | 427/386 |
| 5,240,645 | 8/1993 | Strecker | 252/511 |
| 5,260,120 | 11/1993 | Moyle et al. | 428/219 |
| 5,270,364 | 12/1993 | Schwartz et al. | 524/106 |
| 5,624,978 | 4/1997 | Soltwedel et al. | 523/402 |

OTHER PUBLICATIONS

Chatterjee, K.L. et al., "Electrode Wear During Spot Welding of Coated Steels", Welding & Metal Fabrication, pp. 110–114 (Mar. 1996).

*Primary Examiner*—Michael Lusignan
*Attorney, Agent, or Firm*—Steven C. Benjamin; Gerald K. White

[57] ABSTRACT

A weldable heat curable liquid coating composition for steel is provided that exhibits improved mar resistance without impairing the weldability characteristics of the coating. To this end, the composition contains a conductive welding aid of iron dust. The weldable coating when applied to steel and cured thereon to a dry film allows for spot welding of the coated steel without requiring special welding equipment and techniques.

26 Claims, No Drawings

MAR RESISTANT, CORROSION INHIBITING, WELDABLE COATING CONTAINING IRON POWDER FOR METAL SUBSTRATES

FIELD OF THE INVENTION

This invention relates to corrosion inhibiting organic coatings for metal substrates, and, more particularly to weldable corrosion inhibiting organic coatings having improved mar resistance without sacrificing weldability, and to a method of using the same to weld two pieces of metal together.

BACKGROUND OF THE INVENTION

For many years, corrosion inhibiting organic coatings have been applied to metal coils or sheets prior to forming into finished articles. Designing with prepainted metal provides the metal finisher with many benefits, such as elimination of in-house painting operations, reduction in associated environmental liabilities, and improvement in the quality of the paint finish. One of the problems encountered in using prepainted metal is that if such articles are to be assembled, they must be joined together by adhesives or weldless fasteners, since organic coatings are insulative in nature and are either not weldable or weldable with difficulty and only by employing special techniques and equipment.

These techniques include spot welding with higher currents or longer weld times. However, such unorthodox methods are time-consuming and costly. Also, excessive temperatures are normally generated in the weld areas, which, in turn, causes vaporization and expulsion of the metal out from between the welding electrodes. This results in inferior welds as well as rapid deterioration of the electrode tips. Other techniques include decreasing the thickness of the protective film which sacrifices corrosion protection for weldability.

Recently, there has been a growing demand for "weldable" organic coatings. Organic coatings which are electroconductive and allow for electric resistance welding through their cured coating films without resorting to special equipment and techniques are said to be "weldable" or have weld-through capability. Various types of weldable anticorrosive liquid coatings have been proposed which typically contain conductive powdered metals or alloys to reduce the electrical resistivity of the coating film U.S. Pat. No. 5,001,173 (Anderson et al.) discloses some commercially popular weldable primers which contain high concentrations of conductive powdered ferroalloys, such as ferrophosphorous (a mixture containing di-iron phosphide and iron phosphide), and powdered zinc.

Zinc powder alone is not considered a good welding aid. Moreover, one of the problems encountered with ferrophos-rich weldable coatings in their appearance. Ferrophos is a very dark gray pigment, and when provided in the coatings in the high pigment to binder ratio necessary to impart desired weldability, it tends to produce very dark gray colored films, which are undesirable in certain applications. For instance, mar resistance is almost nil and even fingernail scratches are highly visible. In addition, the dark gray coating film tends to detract from the appearance of any topcoat finish applied thereover. Usually, it is necessary to topcoat at high film builds for adequate hiding or encryption of the primer, which, in turn, is very costly. Attempts have been made to lighten weldable primers to improve mar resistance and cryptability by adding standard light colored pigments, such as titanium dioxide, without much success. The standard pigments are inhibitively insulative, and the high pigment concentration needed to offset the darkness tends to impair weldability.

One solution to this problem has been to return to the use of standard non-weldable mar resistant coatings. Yet without welding aids in the formulations, the very thin films (i.e., no greater than about 0.1 mil thick) required for weldability is usually below the minimum thickness needed to provide adequate film opacity and corrosion resistance. Another approach taken has been to use a two-coat weldable primer as disclosed in U.S. Pat. No. 5,260,120 (Moyle et al.), wherein a ferrophos-rich primer is top coated with an extremely thin layer of a non-weldable, titanium dioxide-rich, protective coating. The thin protective film provided does not significantly interfere with the weldability of the conductive primer, yet provides a light colored surface film which has greatly improved mar resistance. The protective film also smooths out the abrasiveness of the underlying ferrophos primer. However, it is time-consuming and costly to employ such a two-step coating procedure.

Another problem encountered with weldable ferrophos-rich primers is their abrasiveness, which raises excessive stamping and forming die wear concerns during metal finishing operations. The abrasive, sandpaper, texture of the film finish is due to the hardness of the ferrophos. As mentioned above, the Moyle et al. patent provides a solution to this problem but again requires an undesirable two-step coating procedure.

A further problem with ferrophos-rich primers is that during welding they produce toxic fumes, such as phosphine gas, along with objectionable odors when subject to the required welding temperatures. While the toxicity does not reach the environmentally harmful and physiologically unsafe levels, workers have been known to complain about unpleasant odors produced during welding. It is difficult, or course, to reduce toxic effluents and eliminate unpleasant odors produced by ferrophos primers without sacrificing weldability.

Still another problem encountered with ferrophos-rich primers is that the film finish has a very high coefficient of friction. During metal finishing, the stamping and forming dies tend to scape off the coating film. Corrosion protection in these areas is thus lost. Also, the paint scrapings tend to build-up and eventually cause the finishing line to shut down. Internal lubricants, such as polytetrafluoroethylene, have been incorporated in conductive coatings to lower surface friction, allowing the finishing operations to proceed without destroying the coating, as disclosed in U.S. Pat. No. 5,624,978 (Soltwedel et al.).

Weldable primers also invariably shorten the life of the welding electrodes. Copper tipped electrodes on resistance spot welders are easily degraded by coating pick-up during welding. The number of spot welds that can be made on precoated metal before corrective action is required is dramatically reduced in comparison to that for bare metal. This results in reduced productivity arising from the need to change or dress the electrodes more frequently as well as inconsistent weld quality. Weldable coatings which extend the electrode life are continually being sought.

Other types of weldable liquid coatings have been disclosed which contain metallic welding aids other than ferrophos or zinc powders, but all of them suffer from drawbacks. For example, U.S. Pat. No. 5,047,451 (Barrett et al.) discloses a weldable liquid anticorrosive primer containing a welding agent of powdered nickel, a non-weldable corrosion inhibitor of powdered aluminum or stainless steel, a polyethylene suspension agent for preventing the finely divided metal from settling out, a silane-treated silicon dioxide thixotropic agent, a drawing agent of polytetrafluoroethylene, and a hygroscopic agent. Nickel powder, however, is dark gray and thus undesirable for improving mar resistance and topcoat crypt. Nickel powder is also an expensive material and uneconomical for use in weldable coatings.

Earlier U.S. Pat. No. 2,666,835 (Elleman) discloses a weldable liquid anticorrosive zinc chromate primer containing up to 30 vol. % of primer solids of a non-oxidized, magnetic, metal powder, such as non-oxidized forms of nickel powder, soft iron powder, stainless steel powder, steel powder, and nickel alloy powder. Nickel powder, however, is clearly preferred due to its inherent possession of magnetic remanence, which causes the metal particles to naturally link together and form conductive chains in the paint film. While coatings containing soft iron powder are mentioned, Elleman suggests the need for chemically reducing the thin oxide layer normally present on iron powder before incorporating it in the coating. This special procedure, for inclusion of only substantially non-oxidized soft iron powder, is time-consuming and costly.

Elleman also resorts to other special techniques for generating the weldable coating. For instance, Elleman suggests the need to expose the liquid coating to a magnetic field prior to drying on metal, in order to uniformly align the metal particles and thus impart the necessary conductivity to the film. This adds a time-consuming step to the welding process which, in turn, leads to reduced productivity and increased costs. These primers also require zinc chromate. While chromate pigments, including zinc chromate, strontium chromate, calcium chromate, and lead chromate, are excellent corrosion inhibitors, they are bright yellow insulative pigments and tend to produce darker coatings having reduced mar resistance and higher topcoat crypt.

What is needed is a weldable liquid corrosion inhibiting coating which forms a dry, electroconductive film on metal substrates which has improved mar resistance, improved topcoat crypt, reduced abrasiveness, reduced friction, reduced toxic and unpleasant odor emissions, extended electrode life, without sacrificing weldability and corrosion resistance, and that can weld together, in its cured state, two pieces of metal, such as steel, coated with the same, without the need for special equipment and techniques.

SUMMARY OF THE INVENTION

It is an object of this invention, therefore, to provide a weldable liquid coating for metal substrates, such as steel, which does not suffer from the foregoing drawbacks.

It is another object of this invention to provide a weldable coating that has improved mar resistance and topcoat crypt without sacrificing weldability and corrosion protection.

Still another object of this invention is to provide a weldable coating that has a relatively non-abrasive texture to prevent die wear.

Yet still another object of this invention is to provide a weldable coating that has a low coefficient of friction to prevent destruction of the coating film during metal finishing.

And another object of this invention is to provide a weldable coating that emits low levels of toxic effluents and unpleasant odors during welding.

A further object of this invention is to provide a weldable coating that is weldable without rapidly deteriorating the life of welding electrodes.

It is a still another object of the present invention to provide a weldable coating that has excellent corrosion resistance.

It is a related object to provide a method of welding together metal articles having coated and cured thereon a weldable coating of the aforesaid character without the need for special equipment or techniques.

The aforesaid and other objects are achieved by providing a weldable liquid coating composition for metal in which a welding aid of conductive iron powder is incorporated in the liquid coating to impart weldability without substantially darkening the coating, such that when the coating is applied and cured on a metal substrate, the coating film not only has improved mar resistance and crypt, but also allows the coated metal to be electric resistance welded without requiring special welding equipment and techniques. The iron powder particles found most useful are shiny and smooth irregular spheroids produced by water jet atomization. No chemical reduction of the iron powders is required immediately prior to incorporation into the liquid coating. Furthermore, the iron powders require no magnetization and remain randomly oriented in the liquid coating.

The preferred weldable liquid coating composition of this invention comprises a solvent-borne, thermosetting, epoxy-pendant, urethane coating which is characterized by a solvent blend of: a) a film-forming hydroxy-functional resin, preferably a mixture of hydroxy-functional polyester resins and bisphenol A epoxy resins; b) a crosslinker for the resin which effects a urethane cure, preferably a mixture of blocked isocyanate resins and aminoplast resins; c) a catalyst; d) a weldably effective amount of conductive iron powder particles of the aforesaid character randomly dispersed in the liquid to impart desired weldability to the coating film; e) optional yet preferred suspension aid to prevent the iron powder particles from settling out; f) optional yet preferred internal lubricant comprising polytetrafluoroethylene to lower the coefficient of friction of the film; and, g) minor amounts of insulative light colored pigments, wherein the composition is further characterized in that it is free of ferrophos and other ferroalloy and nickel welding aids, and it may also be free of non-weldable anticorrosive chromate pigments.

This weldable coating not only has improved mar resistance and cryptability without sacrificing weldability and corrosion protection, but also exhibits reduced abrasiveness for preventing excessive die wear during finishing, reduced coefficient of fraction to prevent destruction of the film during finishing, emits few toxic effluents and unpleasant odors during welding operations, sustains the life of the copper-tipped welding electrodes, and has the ability to weld together two pieces of coated metal using a weld cycle similar to that for bare steel, The aforesaid and other objects are also achieved by using the liquid coating of the aforesaid character to weld together two pieces of metal. The liquid coating is applied to metal sheets or coil and heat cured thereon to form a hardened dry film. Two pieces of coated metal are then welded together, for example, using a standard spot welder, without requiring special equipment and techniques.

The various objects, features and advantages of the invention will become more apparent from the following description and appended claims.

DETAILED DESCRIPTION OF THE PREFERRED EMBODIMENTS OF THE INVENTION

Throughout this specification, all parts and percentages specified herein are by weight unless otherwise stated.

In this invention, a weldable corrosion inhibiting coating composition in liquid form is applied to a metal substrate. The liquid coating is converted to a solid dry film which is bonded to the metal substrate by heating at elevated temperatures. The heating evaporates the solvents in the liquid layer and initiates curing of a film-forming resin to provide a weldable protective coating film permanently adhered to the substrate.

FILM-FORMING RESIN

The weldable coating composition of this invention includes a film-forming resin component. A wide variety of traditional film-forming resins may be employed in this invention, such as polyester, epoxy, urethane, acrylic and methacrylic resins. These resins generally include a plurality of crosslinkable functional groups to initiate curing into a dry film.

The preferred resin component is a hydroxy-functional resin. Hydroxy-functional resins provide the building blocks for producing flexible urethane coatings, which are desired in this invention.

One suitable class of hydroxy-functional resins useful herein include hydroxy-functional polyester resins. These polyester resins can be prepared by any of the methods well known to those of ordinary skill in the art. For example, condensation reactions can be carried out between one or more aliphatic or cycloaliphatic di- or polyhydric alcohols and one or more aliphatic, cylcoaliphatic, or aromatic di- or polycarboxylic acids, or corresponding anhydrides.

Among the polyester resins which are useful herein are linear polyesters derived from aromatic dicarboxylic acids and alkylene glycols. Examples of suitable aromatic dicarboxylic acids include terephthalic acid, bibenzoic acid, ethylene bis-p-oxy benzoic acid, tetramethylene bis-p-oxy benzoic acid, 2,6-naphthalic acid, orthophthalic acid, and isophthalic acid. Mixtures of terephthalic acid and isophthalic acid are particularly useful. Examples of suitable alkylene glycols include ethylene glycol, trimethylene glycol, pentamethylene glycol, 1,2-propanediol, 1,3-propanediol, 1,4-butanediol, neopentyl glycol, 1,6-hexanediol, 1,4-cyclohexanedimethanol, and polyethylene glycol.

The linear polyesters can also be derived from mixtures or aromatic dicarboxylic acids and aliphatic dicarboxylic acids and alkylene glycols. Examples of suitable aliphatic dicarboxylic acids include maleic acid, fumaric acid, adipic acid, pimelic acid, suberic acid, sebacic acid, azelaic acid, oxydibutyric acid, 5-oxa-1,10-decanedioic acid, 4-n-propyl suberic acid, dodecane dioic acid, and tridecane dioic acid.

The relative amounts of aromatic dicarboxylic acid and aliphatic dicarboxylic acid may be varied in order to obtain polyesters having different characteristics. In general, the ratio of aromatic acid to aliphatic acid will be from about 2:1 to 1:2 and more often about 1:1 on an equivalent weight basis. The ratio of dicarboxylic acid to dihydric alcohol also may be varied, however, with the diol generally being present in excess. The ratio of dicarboxylic acid to diol is generally from about 1:1 to 1:2 on a weight equivalent basis.

The reaction between the dicarboxylic acid mixture and dihydric alcohol mixture is effected in the conventional manner, typically by heating the mixture to an elevated temperature in the presence of catalysts. Tin catalysts are especially useful, including dibutyltin oxide and dibutyltin dilaurate. Antimony oxide may also be used as a catalyst.

The hydroxy-functional polyesters prepared in this manner will generally have molecular weights ranging between about 5,000 and 50,000, and will further have hydroxyl numbers of between about 5 and 35.

In a preferred embodiment, the polyester resin comprises between about 20 and 60 wt. % of total solids, and, more preferably, between about 35 and 45 wt. %.

The film-forming resin component of the weldable coating composition may also contain other resins that are capable of modifying the properties of the polyester-rich blend, such as epoxy resins, which improve the adhesion and flexibility of the coating film, through incorporation of pendant epoxy groups in the urethane compound. Epoxy resins generally refer to the condensation reaction products of an epihalohydrin and a hydroxy-containing compound or a carboxylic acid. The epoxy resins may be of the ether- or ester-types, although the ether-type epoxy resins are preferred.

Ether-type epoxy resins are formed by reacting an epihalohydrin, such as epichlorohydrin, and a compound containing at least two free alcoholic hydroxyl and/or phenolic hydroxyl groups per molecule. The condensation reaction is typically carried out under alkaline conditions, or, in the alternative, in the presence of an acid catalyst. The products of such reactions are generally complex mixtures of glycidyl polyethers.

The ether-type epoxies can be derived from aliphatic alcohols, such as ethylene glycol, diethylene glycol, and higher poly(oxyethylene) glycols, propane-1,2-diol and poly(oxypropylene)glycols, propane-1,3-diol, poly(oxytetramethylene) glycols, pentane-1,5-diol, hexane-2,4,6-triol, glycerol, 1,1,1-trimethylolpropane, pentaerythritol, sorbitol; from cycloaliphatic alcohols, such as resorcitol, quinitol, bis(4-hydroxycyclohexyl)methane, and 2,2-bis(4-hydroxycyclohexyl)propane; and, from alcohols having aromatic nuclei, such as n,n'-bis(2-hydroxyethyl)aniline and p,p'-bis(2-hydroxyethylamino)diphenylmethane. The esters may also be made from mononuclear phenols, such as resorcinol and hydroquinone; from polynuclear phenols, such as bis (4-hydroxyphenyl) methane (bisphenol F), 4,4'-dihydroxydiphenyl, bis(4-hydroxyphenyl)sulfone, 1,1,2,2-tetrakis(4-hydroxyphenyl)ethane, 2-2-bis(4-hydroxyphenyl)propane (bisphenol A), 2,2-bis(3,5-dibromo-4-hydroxyphenyl)propane; and, from novolaks formed from the condensates of aldehydes, such as formaldehyde, acetaldehyde, chloral, and furfuraldehyde, with phenol, chlorinated phenols, such as 4-chlorophenol, 2-methylphenol, and 4-tert-butylphenol.

Particularly preferred epoxy resins useful herein are diglycidyl ethers of bisphenol A, which are formed from the condensation reaction of epichlorohydrin with bisphenol A in the presence of alkaline catalyst. Bisphenol A type epoxy resins are commercially available from a wide variety of sources. Exemplary of bisphenol A type epoxy resins include those sold under the trade name "Epon" by Shell Oil Company. Other desirable epoxy resins include the diglycidyl ethers of other bisphenol compounds, such as bisphenol B, F, G and H.

Another suitable class of epoxy resins useful in the present invention are the epoxidized novolaks, such as the epoxy cresol- and epoxy phenol-novolak resins. Aliphatic or cycloaliphatic epoxy resins can also be utilized in the present invention.

The epoxy resins prepared in this manner will generally have molecular weights ranging between about 300 and 100,000 and epoxide equivalent weights of between about 150 and 10,000.

In a preferred embodiment, the epoxy resin comprises between about 0.5 and 10 wt. % of total solids, and, more preferably, between about 1 and 2 wt. %.

The total amount of film-forming resin in the weldable coating of this invention is usually between about 30 and 60 wt. % of total solids, and, preferably, between about 40 and 50 wt. %.

It will be apparent to those skilled in the art that other suitable film-forming resins may be employed in the coating composition of this invention, although the aforesaid resins are most preferred.

CROSSLINKER

The curing agent or crosslinker for the film-forming resin component can be selected from a variety of curing agents traditionally known to be useful for curing such resins. As previously mentioned, a urethane curative system is preferred. Curing agents suitable for effecting a urethane cure include isocyanates and blocked isocyanates, although blocked isocyanates are most preferred.

Free isocyanates are generally not used in this invention, since the weldable coating composition is usually coil coated onto the metal substrate from a reservoir. The coating, therefore, should have a suitably long pot life, such that is does not cure and harden prematurely in the reservoir.

Blocked isocyanate resins are based on the reaction products of aliphatic, cycloaliphatic or aromatic di- and polyisocyanates and isocyanate blocking agents which prolong the pot life of the coating. Standard methods can be used to prepare the blocked isocyanates, for example, by biuretization, dimerization, trimerization, urethanization, and uretidionization of the starting monomeric isocyanates.

Examples of suitable aliphatic diisocyanates, include 1,4-tetramethylene diisocyanate and 1,6-hexamethylene diisocyanate. Examples of suitable cycloaliphatic diisocyanates, include 1,4-cyclohexyl diisocyanate, isophorone diisocyanate, and 4,4'-methylene-bis-cyclohexyl isocyanate. Examples of suitable aromatic diisocyanates, include 4,4'-diphenylmethane diisocyanate, 1,3-phenylene diisocyanate, 1,4-phenylene diisocyanate, and 2,4-toluene diisocyanate. Examples of suitable polyisocyanates, include 1,2,4-benzene triisocyanate, polymethylene polyphenyl isocyanate, and the like.

The blocking agent is typically selected from those materials that react with the functional groups of the isocyanate so as to form stable adducts at room temperature, but that can be dissociated at elevated temperature. Examples of suitable blocking agents, include lactams, such as caprolactam and butyrolactam, lower alcohols, such as methanol, ethanol, and isobutyl alcohol, oximes, such as methyl ethyl ketoxime and cyclohexanone oxime, phenols, such as phenol, p-t-butyl phenol and cresol, and pyrazoles, such as 3,5-dimethylpyrazole.

In a preferred embodiment, the blocked isocyanate crosslinker comprises between about 0.5 and 10 wt. % of total solids, and, preferably, between about 2 and 5 wt. %

In addition to the aforesaid crosslinkers, it is generally preferred to include other crosslinkers to provide the desired final urethane film properties, such as hardness, adhesion, flexibility and solvent resistance. One suitable class of crosslinkers are the aminoplast resins.

Aminoplast resins are based on the reaction products of formaldehydes with amino- or amido-group carrying compounds. A wide variety of aminoplast resins are useful in the practice of this invention. Examples of suitable aminoplast resins, include condensation products of aldehydes, particularly formaldehyde, with melamine, urea, dicyanodiamide, benzoguanamine, and glycouril. Aminoplasts which are modified with lower alkanols having from about 1 to 4 carbon atoms are preferred. The melamine-formaldehyde condensates of hexamethoxymethyl melamine and butylated melamime-formaldehyde are especially preferred. The aminoplast resins facilitate hardening of the crosslinked urethane resin backbone. Phenoplasts and carbamates can also be used.

In a preferred embodiment, the aminoplast crosslinker comprises between about 0.5 and 10 wt. % of total solids, and, preferably, between about 2 and 5 wt. %.

In order to achieve the outstanding properties which make these weldable coatings particularly useful, it is desirable that the amount of crosslinker be sufficient to substantially completely react with the functionalities present in the film-forming resin component.

The total amount of crosslinker in the weldable coating of this invention is usually between about 0.5 and 10 wt. % of total solids, and, preferably, between about 2 and 5 wt. %.

Other suitable crosslinkers will be apparent to those skilled in the art.

CATALYST

The coating composition of this invention may also include a cure catalyst or accelerator to increase the rate of the crosslinking reaction between the film-forming resin and the crosslinker. A wide variety of catalysts traditionally employed for urethane cure systems can be used. Examples of suitable catalysts include tertiary amines, such as triethylene diamine, organometallic salts, particularly organotin compounds, such as dibutyltin dilaurate, dibutyltin dilauryl mercaptide, dibutyltin maleate, dimethyltin dichloride, dibutyltin di-2-ethylhexoate, dibutyltin diacetate, stannic chloride, ferric chloride, potassium oleate, and acid catalysts, such as phosphoric acid, alkyl or aryl acid phosphates, such as butyl acid phosphate or phenyl acid phosphate, and sulfonic acids, such as methane sulfonic acid, benzene sulfonic acid, p-toluene sulfonic acid, naphthalene sulfonic acid, dodecylbenzene sulfonic acid, and dinonylnaphthalene sulfonic acid. Acid catalysts blocked with amines and pyridines are also useful for improving shelf stability.

The catalyst is generally employed in an effective amount to initiate the crosslinking reaction at commercially acceptable rates.

In a preferred embodiment, the catalyst comprises between about 0.1 and 1 wt. % of total solids, and, more preferably, between about 0.3 and 0.5 wt. %.

For a further description of particularly useful liquid, urethane film-forming, coating systems, reference can be made to U.S. Pat. Nos. 5,001,173; 5,260,120; and 5,624,978, which disclosures are incorporated by reference herein in their entireties.

WELDABILITY AGENT

Conductive ferrous metal powder, particularly iron metal powder, is employed in this invention as the weldability agent or welding aid. Powdered iron is a very inexpensive material. Even more significantly, powdered iron offers very little color to the coating, which dramatically improves the mar resistance and cryptability of the weldable coating film without sacrificing weldability, film opacity, and corrosion protection.

Powdered iron also reduces the abrasiveness of the finished coating, does not cause the coating to emit high levels of toxic effluents and unpleasant odors during welding, sustains the life of the welding electrodes and the forming dies, and converts the coating into a composition that has welding characteristics similar to that for bare steel. The desired adhesion, flexibility, formability of the coating are, furthermore, not impaired using powdered iron.

The preferred iron powder employed in this invention comprises finely divided iron particles which have shiny, silvery, uncorroded, smooth surfaces and are in the form of irregular spheroids, resembling ball bearings. Such irregular spheroids are traditionally produced by water jet atomization methods. It should be understood that the geometry of the iron powder varies significantly with their production method.

Water jet atomization, in particular, involves the introduction of a stream molten iron which is poured from a ladle into an atomizing chamber wherein the stream is directed past one or more nozzles which direct pressurized jets of water to impinge against the down pouring molten metal stream. The stream is caused to split up into multiple droplets which rapidly cool and coagulate, forming solid particles of iron powder that fall to the bottom of the atomizing chamber while solidifying. The iron particles thus formed are then collected, preferably in water, and subsequently separated from most of the water by, for example, heated drying followed by magnetic separation. The particles are usually screened at this point to eliminate undesirably large particles that can be reworked. The dried particles are then collected and passed through an annealing furnace at about 1,400° F. in a reducing atmosphere of hydrogen, and the iron dust particles are finally collected in the form of smooth, shiny, irregular (i.e., spattered) spheroids. For a further description of water jet atomization techniques, reference can be made to U.S. Pat. Nos. 3,764,295; 3,909,239; and, 4,274,864, which disclosures are incorporated by reference herein in their entireties.

The preferred iron particle size is less than about 100 mesh (150 microns), and, more preferably, less than about 325 mesh (45 microns). Commercial powders which contain about 85 to 95% of the iron particles smaller than 325 mesh and the remainder between 100 mesh and 325 mesh are most desirable. The apparent density of the iron powder is preferably between about 2.85 and 3.30 g/cc. Exemplary of such atomized iron powder is that sold under the trade name "Anchor ATW-230" by Hoeganaes of Riverton, N.J.

Iron powders can also be produced by other traditional methods which produce spheroids, such as air atomization which gives irregular spheroids or dissociation of iron carbonyls which gives more uniform ultra fine spheroids. Methods which produce spongy iron particles, such as the direct reduction of iron ore or scale are generally discouraged in this invention, since it has been found that iron with a shiny surface are far superior to spongy iron particles. Weldable coatings containing spongy iron powder are not easily spot welded under standard conditions. Moreover, a spongy, pumice-like surface tends to darken the iron powder and consequently reduces the mar resistance of the coating films.

In a preferred embodiment, the powdered iron comprises up to about 50 wt. % of total solids, and, more preferably, between about 30 and 40 wt. %.

The weldable coating composition of this invention is further characterized in that no chemical reduction of the natural oxide films on the surface of the iron powder is necessary prior to incorporation in the liquid coating. Furthermore, the liquid coating is not subject to a magnetic field after incorporation of the powdered iron and, therefore, the non-magnetized iron particles remain randomly oriented in the liquid.

The weldable coating composition of this invention is even further characterized as being essentially free of dark gray welding aids, such as ferrophos and nickel powders.

SUSPENSION AGENT

Desirably, a suspension agent is used to ensure that the powdered iron remains stably suspended in the liquid coating and does not settle out and form a hard cake. A suitable suspension agent is polyamide wax. Exemplary of such suspension agents are those sold under the trade name "Disparlon 6900-20X" by King Industries of Norwalk, Conn., which are dispersions of swollen particles of polyamide wax in low boiling alcoholic solvents such as xylene. Other suitable suspension agents include silicon dioxide, for example, fumed silica, silane treated silica, phosphoric acid, alkylated or arylated phosphoric acid, and quaternary amine treated magnesium aluminum silicate. The suspension agents also serve as thixotropic agents to prevent gelation of the coating before application. Silicone dioxide additionally functions as a hygroscopic agent or water scavenger in the coating composition.

In a preferred embodiment, the amount of suspension agent present in the coating composition is between about 0.3 and 2 wt. % of total solids, and preferably between about 0.4 and 0.6 wt. %.

INTERNAL LUBRICANT

An internal lubricant may be incorporated in the coating composition to lower the coefficient of friction of the coating film. Polytertrafluoroethylene (PTFE) is the preferred internal lubricant due to its ability to dramatically lower the coefficient of friction of the film finish, thus allowing metal forming and finishing without destroying the coating film. Other halogen-containing thermoplastic polymers can also be used, although PTFE has superior lubricant properties. Blends of PTFE and polyethylene (PE) are also useful. Other suitable internal lubricants, such as glycerol esters, fatty acids, fatty acid esters, fatty acid amides, fatty acid salts, fatty alcohols, and molybdenum disulfide, may be used as well.

Desirably, the PTFE has particles in the size ranging from about 0.01 to 30 microns, and, more preferably, from about 1 to 15 microns. Suitable PTFE is sold under the trade name "Polyfluo 190" by Micro Powders of Scarsdale, N.Y.

The weldable coating composition preferably contains internal lubricants, desirably PTFE, in an amount ranging between about 0.2 and 1.5 wt. % of total solids, and, more preferably, between about 0.5 and 1 wt. %.

PIGMENT

The weldable coating composition of this invention may also contain light colored insulative pigment powders to further improve the mar resistance, crypt, and opacity of the coating film, as well as to provide the desired final appearance, yet without sacrificing the weldability of the coating. The choice of pigment will depend on the particular color or colors desired in the coating. The pigments may be organic or inorganic pigments, although inorganic pigments are generally utilized. Suitable inorganic pigments include metal oxides, especially titanium dioxide. Other metal oxides include, zinc oxide, aluminum oxide, magnesium oxide, iron oxide, chromium oxide, lead oxide, nickel oxide, silver oxide, tin oxide, and zirconium oxide. Other inorganic pigments which may be utilized include inorganic sulfides, sulfoselenides, ferocyanides, aluminates, phosphates, sulfates, borates, carbonates and especially titanates.

The pigment can be present in the coating in reduced concentrations and still achieve the desired mar resistance and crypt. The ability to lower the concentration of non-weldable pigments dramatically improves the weldability of the coating, especially at the high dry film builds desired for adequate coverage, opacity, and corrosion protection. In this invention, mar resistant coating film builds as high as about 1.0 mil thick coated on each side of the metal surface remain weldable without resorting to special equipment and techniques.

In a preferred embodiment, the insulative pigment comprises no greater than about 25 wt. % of total solids, and, more preferably, between about 10 and 20 wt. %.

The pigment to binder ratio is usually no greater than about 2, and, preferably, between about 1 and 1.5

CORROSION INHIBITING AGENT

The coating composition of this invention may also contain a corrosion inhibiting agent to enhance corrosion protection of the underlying metal substrate. In this invention, a corrosion inhibiting agent is optional, since the conductive powdered iron welding aid also serves as a sacrificial anode and thus provides cathodic protection against galvanic corrosion of the metal substrate.

Suitable corrosion inhibiting agents include finely divided metals, such as powdered zinc spheroids or flakes. Typically the zinc powder is prepared through distillation of zinc dust or by air atomization of molten zinc. Zinc powder typically has a particle size ranging from about 1 to 15 microns, preferably from about 2 to 6 microns. Zinc powder, in particular, improves the corrosion resistance of the coating, yet without significantly darkening the coating film.

Other corrosion inhibitors can be employed which include anticorrosive insulative chromate pigments, such as strontium chromate. It is generally preferred, however, that the weldable coating composition of this invention is further characterized as being essentially free of anticorrosive pigments, including strontium chromate, calcium chromate, zinc chromate and lead chromate, since these pigments impair the mar resistance and crytability as well as weldability of the coating film. However, in certain circumstances they may be desirable.

The corrosion inhibiting agent, desirably zinc powder, if employed, may comprise up to about 10 wt. % of total solids, and, more preferably, between about 3 and 10 wt. %, although it is most preferred not to employ the same.

OTHER ADDITIVES

In addition to the above-described components, the weldable coating composition of this invention can contain the usual functional additives that are well known in the art, such as, the flow control agents, for example, polyacrylic resins. Flow control agents are usually present in amounts up to about 1 wt. % of total solids, and, preferably, between about 0.06 and 0.5 wt. %. The polyacrylic resins generally include methyl(meth)acrylate resins, ethylene vinyl acetate resins, and the like. Other thixotropic agents, light stabilizers, surfactants, wetting agents, dispersing aids, flattening agents, antioxidants, flocculating agents, foam control agents, etc., can also be employed. Inorganic fillers, such as calcium carbonate, may also be included in the coating. Adhesion promoters are usually present as well in amounts up to about 0.5 wt. % of total solids, and, preferably, between about 0.01 and 0.1 wt. %. One suitable class of adhesion promoters are the epoxy phosphate esters, which are generally prepared by reacting an epoxy resin with phosphoric acid. Phosphoric acid may also be considered an adhesion promoter.

SOLVENT

The aforesaid components of the coating composition are blended together in a suitable vehicle or carrier for the solids, such as an aqueous or organic solvent, to facilitate formulation and liquid application. Suitable organic solvents include aromatic and aliphatic petroleum distillates, such as Aromatic 100, Aromatic 150, Aromatic 200, dibasic esters (DBE), V M & P naptha, hexane, and the like, ketones, such as isophorone, methyl ethyl ketone, methyl isobutyl ketone, methyl isoamyl ketone, diisobutyl ketone, acetone, and the like, alcohols, such as ethyl alcohol, propyl alcohol, diacetone alcohol, 2-ethyl hexanol, n-butanol, and the like, dimethyl, phthalate, and mono- and dialkyl ethers of ethylene and diethylene glycol, such as ethylene glycol monoethyl ether, ethylene glycol monobutyl ether, ethylene glycol monoethyl ether acetate, propylene glycol monoethyl ether acetate, diethylene glycol monobutyl ether and diethylene glycol diethyl ether, xylene, and the like. Dibasic esters are especially useful solvents, which are typically available as mixtures of refined dimethyl esters of adipic, glutaric and succinic acids.

The weldable coating composition typically contains sufficient solvent to produce the desired viscosity for the particular liquid coating method.

In a preferred embodiment, the viscosity of the uncured liquid coating ranges preferably between about 20 and 50 #4 Zahn at 25° C., and, more preferably, between about 28 and 32.

COATING PREPARATION

The constituents of the weldable coating composition are blended together in any convenient manner known to persons skilled in the art. Moreover, no chemical reduction of the powdered iron is necessary before incorporation into the liquid coating. Also, the liquid coating is not subject to a magnetic field after incorporation of the powdered iron.

METAL SUBSTRATES

The weldable coating composition is usually applied as a primer over a variety of metal substrates. In some cases, the primer may also serve as the final finish. Metal substrates of current interest include zinc-, zinc/nickel alloy, and zinc-iron alloy steels, which include various zinc-containing forms of galvanized steel, steel having a chrome conversion coating (with or without zinc therein) on its galvanized or ungalvanized surface, steel having a zinc-rich primer on either of such surfaces, and steel having FIRST COAT® aqueous epoxy resin/chromium trioxide coating pretreatment (as described in previously mentioned U.S. Pat. No. 5,001,173), that is commercially available from Morton International of Chicago, Ill., baked on either of such surfaces. Other suitable metal substrates include cold rolled and hot rolled steel, aluminized steel, and galvanized steel such as hot-dipped and electrogalvanized steel, galvalume, galvanneal, etc.

COATING ON METAL

The liquid weldable coating can be applied to the metal substrate by any conventional technique, including, for example, dipping, spraying, roll coating, and bar coating. It is preferred to use coil coating (reverse roll coating) techniques to apply the coating.

After application, the weldable coating is heat cured and dried in an oven to a hardened cured film finish on the substrate surface. The wet coating is usually cured at elevated temperatures of between about 390 and 500° F. peak metal temperature, and, preferably, between about 435 and 485° F., for a suitable period of time to fully cure the coating, usually between about 20 and 60 seconds, and, preferably, about 40 seconds.

The weldable coating is generally applied on the substrate in sufficient amounts to provide a dry film coating having a thickness of up to about 1.0 mil on each surface, and usually between about 0.4 and 0.6 mils. It has been advantageously found that two pieces of metal can be coated on both sides with about 1.0 mil of coating film and still be welded together using a weld cycle similar to that for bare steel.

WELDING PRECOATED METAL

After the coating is cured, the coated metal substrates can be welded together by any standard welding technique such as electric resistance (spot) welding, mig welding, tig welding, and arc welding. Spot welding, in particular, involves placing together two pieces of the precoated metal articles to form an assembly and then inserting the assembly between two copper-tipped electrodes of a spot welder. When the welder is turned on, an initial squeeze cycle is performed, wherein the two coated steel plates are further forced together between the welding electrodes. A subsequent weld cycle is performed where sufficient current flows through the assembly including the coating, and finally a hold and off cycle is completed before the welding electrodes are released and the welded assembly is removed from the machine. The formation of a nugget between the welded parts represents an excellent weld.

Any of the standard non-weldable topcoats may be applied to the precoated metal surfaces after welding for a decorative appearance or enhanced corrosion protection.

The invention will be further clarified by a consideration of the following non-limiting examples.

EXAMPLE 1

Mar Resistant Weldable Urethane Primer

The following ingredients were blended together in the order and manner given to provide a solvent borne weldable liquid primer of this invention.

| Ingredients | Weight % |
|---|---|
| CHARGE TO DISPERSING MILL | |
| 30% Dynapol L-205 Polyester Solution[1] | 9.62 |
| TiPure R-900 (TiO$_2$) Pigment[2] | 8.42 |
| AeroSil 200 Fumed Silica[3] | 0.10 |
| Mixed Dibasic Esters (DBE)[4] | 2.53 |
| Panasol AN-3N Solvent[5] | 2.05 |
| Coroc A-620-A2 Acrylic Resin Solution[6] | 0.17 |
| SANDMILL TO 7 HEGMAN GRIND | |
| RINSE SANDMILL | |
| 30% Dynapol L-205 Polyester Solution | 0.82 |
| Mixed DBE | 0.82 |
| RECHARGE TO DISPERSING MILL | |
| THEN ADD UNDER MEDIUM AGITATION | |
| 30% Dynapol L-205 Polyester Solution | 23.33 |
| 40% Mor-Ester 49001 Polyester Solution[7] | 4.15 |
| 55% Mor-Ester 4120 Polyester Solution[8] | 18.26 |
| Mixed DBE | 3.48 |
| Epon 828 Epoxy Resin[9] | 0.84 |
| Desmodur BL 3175 Blocked Isocyanate[10] | 1.08 |
| Resimene 747 Aminoplast Resin[11] | 1.29 |
| Nacure 1051 (DNNSA) Catalyst[12] | 0.22 |
| 10% Phosphoric Acid Solution[13] | 0.50 |
| Metacure T-12 (Dibutyl Tin Dilaurate)[14] | 0.10 |
| Anchor ATW-230 Iron Powder[15] | 20.00 |
| Disparlon 6900-20X Suspension Agent[16] | 0.34 |
| ADJUST VISCOSITY | |
| Mixed DBE | 1.88 |
| Total Weight | 100.00 |

[1]30% Dynapol L-205 Polyester Solution is a solvent solution of 30% Dynapol L-205 polyester resin of about 15,000 molecular weight and about 5–10 hydroxyl number believed to be derived from isophthalic acid, terphthalic acid, ethylene glycol, and neopentyl glycol, and that is commercially available from Hüls of Somerset, NJ, in DBE.
[2]TiPure R-900 is a TiO$_2$ pigment that is commercially available from DuPont of Wilmington, DE.
[3]AeroSil 200 is fumed silica that is commercially available Degussa of Ridgefield Park, NJ.
[4]Mixed Dibasic Esters (DBE) is a commercial mixture of dibasic esters that is commercially available from DuPont of Wilmington, DE.
[5]Panasol AN-3N is a S-100 Aromatic solvent that is commercially available from Ashland Chemical of Columbus, OH.
[6]Coroc A-620-A2 acrylic resin solution is an acrylic flow modifier that is commercially available from Cook Paint & Varnish of Kansas City, MO.
[7]40% Mor-Ester 49001 Polyester Solution is a solvent solution of 40% Mor-Ester 49001 polyester resin of about 35,000 molecular weight and about 9 hydroxyl number derived from terephthalic acid, isophthalic acid, azelaic acid and ethylene glycol, and that is available from Morton International of Chicago, IL, in MEK.
[8]55% Mor-Ester 4120 Polyester Solution is a solvent solution of 55% Mor-Ester 4120 polyester resin of about 13,000 molecular weight and about 20–28 hydroxyl number derived from isophthalic acid, terephthalic acid, hexane diol and neopentyl glycol, and that is available from Morton International of Chicago, IL, in xylene.
[9]Epon 828 Epoxy Resin is a bisphenol A/epichlorohydrin based epoxy of about 350–450 molecular weight and about 175–210 epoxide equivalent weight, and that is commercially available from Shell Chemical Company of Houston, TX
[10]Desmodur BL 3175 is a blocked isocyanate crosslinker resin of methyl ethyl ketoxime blocked 1,6-hexamethylene diisocyanate that is commercially available from Bayer of Pittsburgh, PA.
[11]Resimene 747 is an aminoplast crosslinker resin of hexamethoxymethyl melamine that is commercially available from Monsanto of St. Louis, MO.
[12]Nacure 1051 is a sulfonic acid catalyst of dinonylnaphthalene sulfonic acid (DNNSA) that is commercially available from King Industries of Norwalk, CT.
[13]10% Phosphoric Acid Solution is a solution of 10% phosphoric acid catalyst in isophorone.
[14]Metacure T-12 is a dibutyltin dilauarte catalyst that is commercially available from Air Products of Allentown, PA.
[15]Anchor ATW-320 is atomized iron powder that contains about 95% of the iron particles finer than 325 mesh and the remainder between about 100 and 325 mesh, that is commercially available from Hoeganaes of Riverton, NJ.
[16]Disparlon 6900-20X is a suspension agent of a dispersion of swollen particles of polyamide wax in xylene that is commercially available from King Industries of Norwalk, CT.

Two cold rolled steel panels were individually coated on each side with the foregoing liquid weldable primer and then baked at about 450° F. peak metal temperature for about 45 seconds to yield a cured dry white coating film of about 1.0 mils thick on each side of the two panels.

The weldabilty of the coating film deposited on the cold rolled steel panels was determined by attempting to spot weld the two coated panels together. The coated panels were successfully spot welded together between copper tipped ¼" electrodes using a weld cycle similar to that for bare steel.

The corrosion resistance characteristics of the coating film deposited on the cold rolled steel panels was determined by subjecting the coated panels to a salt water spray test under test method ASTM B-117. Despite the absence of anticorrosive chromate pigments in the primer composition, the corrosion resistance of the coating film was similar to that for chromated primer systems at 240 hours salt spray. The performance of the weldable primer at 580 hours salt spray was significantly worse as would be expected without the protection of chromates. Yet, the improvement in mar resistance and weldability are issues that cannot be obtained with standard chromated primer systems.

EXAMPLE 2

Mar Resistant, Internally Lubricated, Weldable Urethane Primer

The following ingredients were blended together in the order and manner given to provide another solvent borne weldable liquid primer of this invention.

| Ingredients | Weight % |
|---|---|
| CHARGE TO DISPERSING MILL | |
| 30% Dynapol L-205 Polyester Solution | 10.36 |
| Mixed Dibasic Esters (DBE) | 2.47 |
| Panasol AN-3N Solvent | 2.00 |
| TiPure R-900 (TiO$_2$) Pigment | 8.21 |
| 11-3071 Fast Yellow HGR Pigment[1] | 0.49 |
| Cab-O-Sil M-5 Fluffy Fumed Silica[2] | 0.20 |
| Coroc A-620-A2 Acrylic Resin Solution | 0.17 |
| SANDMILL TO 7 HEGMAN GRIND RINSE SANDMILL | |
| 30% Dynapol L-205 Polyester Solution | 0.98 |
| Mixed DBE | 0.98 |
| RECHARGE TO DISPERSING MELL THEN ADD UNDER MEDIUM AGITATION | |
| 30% Dynapol L-205 Polyester Solution | 21.61 |
| Disparion 6900-20X Suspension Agent | 0.49 |
| MIX WELL THEN ADD UNDER MEDIUM AGITATION | |
| 40% Mor-Ester 49001 Polyester Solution | 4.05 |
| 55% Mor-Ester 4120 Polyester Solution | 17.81 |
| Mixed DBE | 4.88 |
| Epon 828 Epoxy Resin | 0.82 |
| Desmodur BL 3175 Blocked Isocyanate | 1.05 |
| Resimene 747 Aminoplast Resin | 1.25 |
| 10% Phosphoric Acid Solution | 0.49 |
| Nacure 1051 (DNNSA) Catalyst | 0.22 |
| Metacure T-12 (Dibutyl Tin Dilaurate) | 0.10 |
| Polyfluo 190[3] | 0.50 |
| Anchor ATW-230 Iron Powder | 19.51 |
| ADJUST VISCOSITY | |
| Mixed DBE | 1.36 |
| Total Weight | 100.00 |

[1]11-3071 Fast Yellow HGR is C.I. Pigment Yellow 191 (inorganic titanate) that is commercially available from Hoechst Celanese of Charlotte, NC.
[2]Cab-O-Sil M5 is fumed silica that is commercially available from Cabot Corporation of Bellerica, MA.
[3]Polyfluo 190 is an internal lubricant of PTFE that is commercially available from Micro Powders of Scarsdale, NY.

Two cold rolled steel panels were individually coated on each side with the foregoing liquid weldable primer and then baked at about 450° F. peak metal temperature for about 45 seconds to yield a cured dry putty yellow coating film of about 1.0 mils thick on each side of the two panels.

The weldability of the coating film deposited on the cold rolled steel panels was determined by attempting to spot weld the two coated panels together. The coated panels were successfully spot welded together between copper tipped ¼" electrodes using a weld cycle similar to that for bare steel.

The invention having been disclosed in the foregoing embodiments and examples, other embodiments of the invention will be apparent to persons skilled in the art. The invention is not intended to be limited to the embodiments and examples, which are considered to be exemplary only. Accordingly, reference should be made to the appended claims to assess the true spirit and scope of the invention, in which exclusive rights are claimed.

What is claimed is:

1. A mar resistant, weldable, liquid coating composition, which comprises a solvent blend of:
   a) an effective film-forming amount of a resin having crosslinkable functional groups;
   b) a crosslinker in an effective amount for curing said resin; and,
   c) a weldably effective amount of a welding aid of finely divided non-magnetized iron metal particles naturally oxidized on their surface, randomly dispersed in said liquid coating,
   said coating being essentially free of ferroalloy and nickel welding aids, and said coating being capable of forming a dry coating film on a metal substrate after curing which is weldable.

2. The composition of claim 1, which further comprises:
   e) a pigment in an effective amount to impart color, lightness and opacity to the coating film upon curing.

3. The composition of claim 2, in which:
   said iron particles are present up to about 50 wt. % of total solids.

4. The composition of claim 2, in which:
   said iron particles are substantially smooth irregular spheroids.

5. The composition of claim 2, in which:
   said iron particles have a particle size below about 100 mesh.

6. The composition of claim 2, in which:
   a plurality of said iron particles have a particle size below about 325 mesh and the balance between about 100 and about 325 mesh.

7. The composition of claim 2, which further comprises:
   d) a catalyst in an effective amount to accelerate cure.

8. The composition of claim 2, which further comprises:
   f) an internal lubricant comprising polytetrafluoroethylene in an effective amount to reduce the coefficient of friction of the cured coating film.

9. The composition of claim 2, which further comprises:
   g) an effective amount of a suspension agent for stably suspending said iron particles in the liquid coating.

10. The coating composition of claim 1, in which:
    said dry weldable coating film formed after curing is an epoxy-pendant, urethane containing compound which is the reaction product of a) said film-forming resin comprising a mixture of at least one hydroxy-functional polyester resin and at least one bisphenol A epoxy resin, and b) said crosslinker comprising a mixture of at least one blocked isocyanate and at least one aminoplast.

11. The composition of claim 7, in which:
    said coating is essentially free of anticorrosive chromate pigments.

12. A method of welding, which comprises:
    a) applying said weldable liquid coating composition of claim 7 onto a metal substrate;
    b) heat curing said coating to a dry film; and,
    c) welding said coated metal substrate to another similarly coated or bare metal substrate using a weld cycle similar to that for bare metal.

13. A mar resistant, weldable, liquid coating composition, which comprises a solvent blend of:

a) an effective film-forming amount of a resin comprising a mixture of one or more hydroxy-functional polyester resins and one or more epoxy resins;

b) an effective amount of a crosslinker for said resin which effects a urethane cure;

c) an effective amount of catalyst to accelerate cure;

d) a weldably effective amount up to about 50 wt. % of total solids of non-magnetized iron powder particles naturally oxidized on their surface, randomly dispersed in said liquid coating, said iron powder particles comprising irregular spheroids having a particle size below about 100 mesh;

e) a pigment in an effective amount to impart color, lightness and opacity to said coating upon curing;

f) a suspension agent in an effective amount for suspending said iron powder particles in said liquid coating, said coating being essentially free of ferroalloy and nickel welding aids, and said coating being capable of forming a dry coating film on a metal substrate after curing which is weldable.

14. The composition of claim 13, in which:

said coating is essentially free of anticorrosive chromate pigments.

15. A mar resistant, internally lubricated, weldable, liquid coating composition, which comprises a solvent blend of:

a) an effective film-forming amount of a resin having crosslinkable functional groups;

b) a crosslinker in an effective amount for curing said resin into a dry coating film;

c) an internal lubricant comprising polytetrafluoroethylene in an effective amount to reduce the coefficient of friction of said dry coating film after curing, and, d) a weldably effective amount of a welding aid of finely divided non-magnetized iron metal particles naturally oxidized on their surface, randomly dispersed in said liquid coating, said coating being essentially free of ferroalloy and nickel welding aids, and said coating being capable of forming a dry coating film on a metal substrate after curing which is weldable.

16. The composition of claim 15, which further comprises:

f) a pigment in an effective amount to impart color, lightness and opacity to said cured coating film.

17. The composition of claim 16, in which:

said iron particles are present up to about 50 wt. % of total solids.

18. The composition of claim 16, in which:

said iron particles are substantially smooth irregular spheroids.

19. The composition of claim 16, in which:

said iron particles have a particle size below about 100 mesh.

20. The composition of claim 16, in which:

a plurality of said iron particles have a particle size below about 325 mesh and the balance between about 100 and 325 mesh.

21. The composition of claim 16, which further comprises:

e) a catalyst in an effective amount to accelerate cure.

22. The composition of claim 16, in which:

said coating is essentially free of anticorrosive chromate pigments.

23. The composition of claim 16, which further comprises:

g) a suspension agent in an effective amount for stably suspending the iron particles in the liquid coating.

24. The composition of claim 16, in which:

said dry weldable coating film formed after curing is an epoxy-pendant, urethane containing compound which is the reaction product of a) said film-forming resin comprising a mixture of at least one hydroxy-functional polyester resin and at least one bisphenol A epoxy resin, and b) said crosslinker comprising a mixture of at least one blocked isocyanate and at least one aminoplast.

25. A method of welding, which comprises:

a) applying said weldable liquid coating composition of claim 16 onto a metal substrate;

b) heat curing said coating to a dry film; and, c) welding said coated metal substrate to another similarly coated or bare metal substrate using a weld cycle similar to that for bare metal.

26. A mar resistant, internally lubricated, weldable, liquid coating composition, which comprises a solvent blend of:

a) an effective film-forming amount of a film-forming resin comprising a mixture of one or more hydroxy-functional polyester resins and one or more epoxy resins;

b) an effective amount of a crosslinker for said resin which effects a urethane cure;

c) a catalyst in an effective amount to accelerate cure;

d) a weldably effective amount up to about 50 wt. % of total solids of non-magnetized iron powder particles, naturally oxidized on their surface, randomly dispersed in said liquid coating, said iron powder particles comprising irregular spheroids having a particle size below about 100 mesh;

e) a pigment in an effective amount to impart color, lightness and opacity to said coating upon curing;

f) an internal lubricant comprising polytetrafluoroethylene in an effective amount to reduce the coefficient of friction of said coating upon curing; and, g) a suspension agent in an effective amount for suspending said iron powder in said liquid coating, said coating being essentially free of ferroalloy and nickel welding aids, and said coating being capable of forming a dry coating film on a metal substrate after curing which is weldable.

* * * * *